United States Patent
Chiu et al.

(10) Patent No.: US 9,778,485 B2
(45) Date of Patent: Oct. 3, 2017

(54) PROCESS FOR APPLYING A FILM STRUCTURE ONTO A LENS BLANK

(75) Inventors: Hao-Wen Chiu, St. Petersburg, FL (US); Zeming Gou, St. Petersburg, FL (US)

(73) Assignee: Essilor International (Compagnie Generale D'Optique), Charenton-le-Pont (FR)

( * ) Notice: Subject to any disclaimer, the term of this patent is extended or adjusted under 35 U.S.C. 154(b) by 840 days.

(21) Appl. No.: 13/880,023

(22) PCT Filed: Oct. 21, 2010

(86) PCT No.: PCT/US2010/053621
§ 371 (c)(1),
(2), (4) Date: Apr. 17, 2013

(87) PCT Pub. No.: WO2012/054046
PCT Pub. Date: Apr. 26, 2012

(65) Prior Publication Data
US 2013/0206328 A1    Aug. 15, 2013

(51) Int. Cl.
*G02C 7/02* (2006.01)
*B29C 63/16* (2006.01)
(Continued)

(52) U.S. Cl.
CPC .............. *G02C 7/024* (2013.01); *B29C 63/16* (2013.01); *B29D 11/0073* (2013.01); *B29L 2011/0016* (2013.01); *Y10T 156/1028* (2015.01)

(58) Field of Classification Search
CPC . B29C 63/16; B29C 63/0073; B29C 63/0047; B29C 66/81455;
(Continued)

(56) References Cited

U.S. PATENT DOCUMENTS

| 4,543,146 A * | 9/1985 | Petcen .......................... 156/242 |
| 6,999,249 B2 * | 2/2006 | Kabeta ..................... G02B 3/00 353/100 |

(Continued)

FOREIGN PATENT DOCUMENTS

| CN | 101835594 | 9/2010 |
| DE | 19832323 A1 | 1/2000 |

(Continued)

OTHER PUBLICATIONS

O-ring. (2015, May 27). In Wikipedia, The Free Encyclopedia. Retrieved 21:57, Jun. 1, 2015, from http://en.wikipedia.org/w/index.php?title=O-ring&oldid=664275474.*

*Primary Examiner* — Matthew Daniels
*Assistant Examiner* — Marta Dulko
(74) *Attorney, Agent, or Firm* — Oblon, McClelland, Maier & Neustadt, L.L.P.

(57) ABSTRACT

A process for applying a film structure onto a lens blank is improved by implementing a wedge piece when the film structure is pressed against the lens blank using a resilient cushion. The wedge piece forces the film structure to conform more tightly to the lens blank within a depression track existing on said lens blank. Then, the lens blank assembled with the film structure has a final optically useful area which is increased.

15 Claims, 3 Drawing Sheets

(51) Int. Cl.
  *B29D 11/00*   (2006.01)
  *B29L 11/00*   (2006.01)

(58) Field of Classification Search
  CPC ........ B29C 66/81427; B29C 66/82421; B29C
       66/345; B29C 66/28; B29C 66/16; B29C
       66/342; B29D 11/00576; B29D 11/00557;
       B29D 11/00923; B29D 11/0073; G02C
       7/04; G02C 2202/16; G02B 3/0031;
       G02B 3/0068; B32B 37/003
  USPC ................ 156/224, 493, 581, 323; 264/1.7
  See application file for complete search history.

(56) References Cited

U.S. PATENT DOCUMENTS

| | | |
|---|---|---|
| 8,349,113 B2 | 1/2013 | Bovet et al. |
| 2003/0152693 A1 | 8/2003 | Su et al. |
| 2007/0195422 A1 | 8/2007 | Begon et al. |
| 2008/0051017 A1* | 2/2008 | Jiang et al. .................. 451/384 |
| 2008/0081108 A1* | 4/2008 | Yamada ................ C03C 17/001 |
| | | 427/164 |
| 2009/0165932 A1* | 7/2009 | Biteau et al. ................. 156/163 |

FOREIGN PATENT DOCUMENTS

| | | |
|---|---|---|
| EP | 0 073 873 | 3/1983 |
| WO | 2005/050265 A1 | 6/2005 |

\* cited by examiner

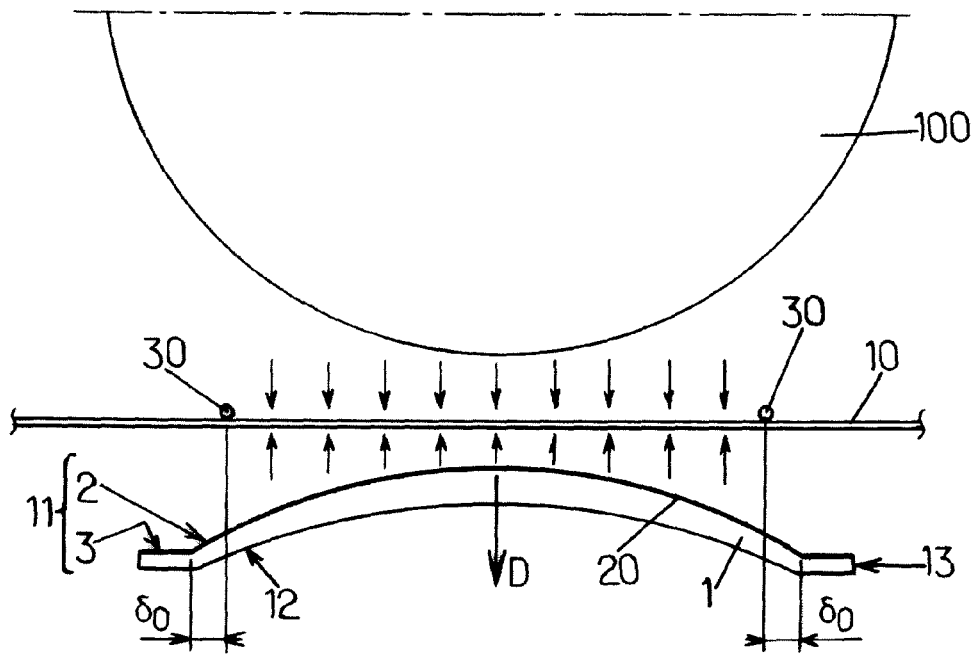
FIG.2a.
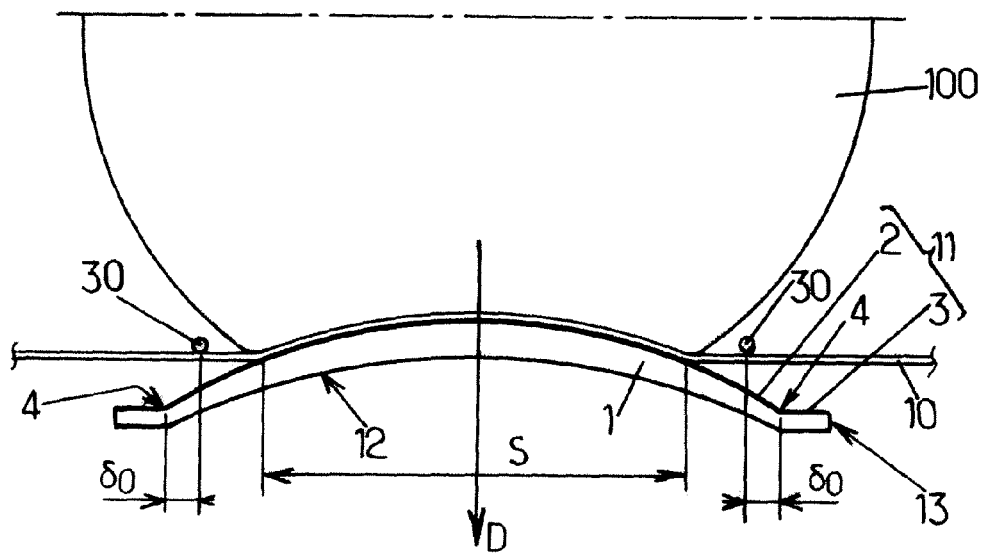

PROCESS FOR APPLYING A FILM STRUCTURE ONTO A LENS BLANK

The invention relates to a process for applying a film structure onto a lens blank.

BACKGROUND OF THE INVENTION

Many lens manufacturing processes require applying a film onto a blank of the lens. The film is designed to provide the final lens with additional properties or functions that the lens blank itself does not have initially. Such properties or functions may be of optical type, for example anti-reflection function, mechanical type, including anti-scratch surface protection, antistatic, etc. This allows the lens blank and the film to be supplied from separate channels, and therefore improves the final yield of the lens production.

But lens production has stringent quality requirements. Indeed defects caused during applying the film onto the lens blank may impair the optical efficiency of the final lens, for example by producing light diffused by the defects. Larger defects may be wrinkles, tears or uneven stretches in the film, and also scratches on the film or the blank surface. All these defects may lead to discarding the lens produced, especially when the lens is intended for ophthalmic use, because aesthetic issues are then very important too.

Therefore, the processes which are implemented for applying a film structure onto a lens blank have been optimized for reducing the defects generated in the final lens. Such process involves the following steps:

/a/ arranging the film structure between a top face of the lens blank and a resilient cushion; and /b/ pressing the film structure against the top face of the lens blank by moving the resilient cushion and the lens blank closer to each other, thereby deforming the resilient cushion and suppressing a gap existing initially between the film structure and the top face of the lens blank, with a contact area of the film structure with the top face which increases when the resilient cushion is being crushed.

Such process is efficient in producing an even application of the film structure onto the lens blank when the top face of this latter is convex. But difficulties arise when the top face of the lens blank contains concave patterns, which extend below a local average height of the top face. Indeed, the resilient cushion fails to push the film structure in the concave pattern so that the film structure conforms tightly to the shape of the pattern. In addition, using a cushion which is either more or less resilient never results in obtaining a satisfactory conformation of the film structure within the concave pattern.

Therefore, an object of the present invention is to propose an improvement to the known application process just described, which improves the quality of the film application when a special type of concave pattern is present in the top face of the lens blank.

SUMMARY OF THE INVENTION

The invention applies when the lens blank is limited by the top face, a bottom face and a peripheral edge which connects the top face to the bottom face, with the top face comprising a convex surface portion and a margin portion located between the convex surface portion and the peripheral edge, and when the convex surface portion and the margin portion form a re-entrant angle along a depression track between these convex surface portion and margin portion.

During the pressing step /b/ of a process as described here-above, the contact area of the film structure with the top face of the lens blank increases progressively from an initial area which is comprised within the convex surface portion, to a final area which extends astride a part at least of the convex surface portion and a part at least of the margin portion adjacent the part of the convex surface portion.

The process of the invention is characterized in that a wedge piece is arranged between the resilient cushion and the film structure so that this wedge piece is pressed against the film structure by the resilient cushion being crushed, and the wedge piece is situated in line with the depression track when the contact area has reached the final area, along the moving direction of the resilient cushion and the lens blank with respect to each other.

Therefore, the invention involves using an additional element during the pressing step /b/, which forces the film structure to conform to the top face of the lens blank deeper in the re-entrant angle. In this way, the area of the convex surface portion of the lens blank top face which is properly covered by the film structure is increased.

According to an improvement of the invention, the wedge piece may be arranged initially so that a projection of this wedge piece onto the top face of the lens blank, along the moving direction, is contained within the convex surface portion apart from the depression track. Then, during the pressing step /b/, the wedge piece is made sliding towards the depression track by the resilient cushion being crushed. Such initial arrangement of the wedge piece and its progressive moving during the film application process ensure further that no wrinkle is produced in the film structure near the depression track, on the convex surface portion side.

BRIEF DESCRIPTION OF THE DRAWINGS

FIGS. 2a to 2d illustrate an implementation of the invention at four successive moments.

For sake of clarity, the elements represented in these figures are not sized in relation with actual dimensions, nor with ratios of actual dimensions. In addition, identical reference numbers used in different figures indicate identical elements.

DETAILED DESCRIPTION OF THE INVENTION

Figure 1A:
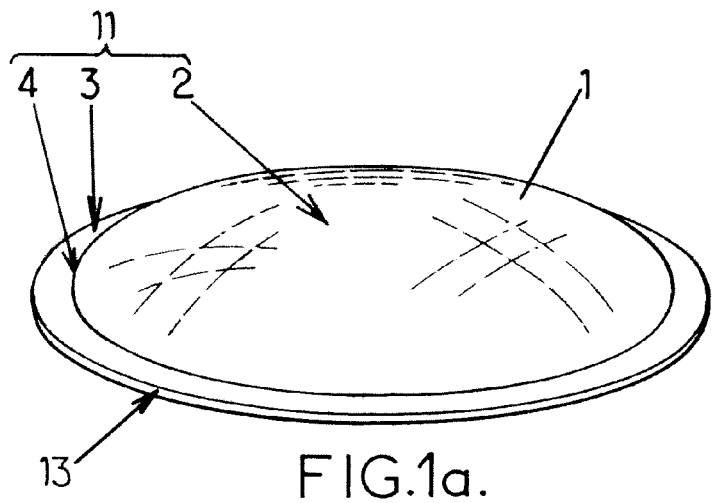
FIGS. 1a and 1b are respectively a perspective view and a sectional view of a lens blank used for the invention.

The invention is now described in the context of manufacturing an ophthalmic eyeglass. This ophthalmic application is used only for illustrative purpose, and the invention may also be implemented for manufacturing any optical lens other than an ophthalmic eyeglass.

In the figures, reference number 1 denotes generally an ophthalmic lens blank designed for eyeglass production. Reference numbers 11, 12, 13 denote respectively the front face, the back face and the peripheral edge of the lens blank 1, referring to the position of the final eyeglass when used by a wearer. The front face 11 is called thereafter top face and the rear face is called bottom face with respect to the implementation of the invention process. Thus, the peripheral edge 13 connects the top face 11 to the bottom face 12 all around the lens blank 1. The peripheral edge 13 is commonly circular, with diameter between 60 mm (millimeter) and 85 mm for example. The lens blank material may be any one commonly used in optics.

The top face 11 comprises a convex surface portion 2 and a margin portion 3 which is located between the convex surface portion 2 and the peripheral edge 13. The convex surface portion 2 and the margin portion 3 form therebetween a re-entrant angle along a depression track 4. Within the context of the invention, the angle θ between the planes respectively tangential to the convex surface portion 2 and the margin portion 3 at the depression track 4 is less than 180°, when measured from outside the lens blank 1. The margin portion 3 may be contained within a plane.

Figure 1B:
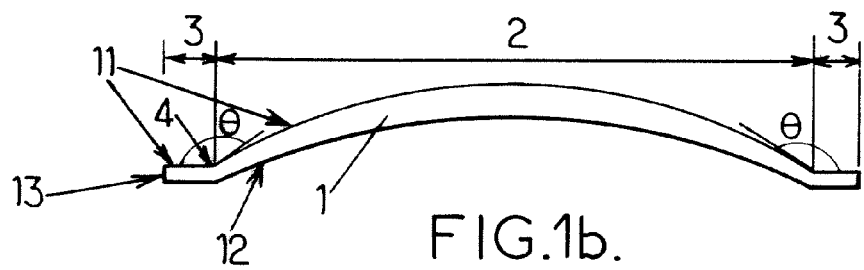

For example, the convex surface portion 2 may form an optically useful area of the eyeglass, and the margin portion 3 may be a planar rim which surrounds the convex surface portion 2 (FIGS. 1*a* and 1*b*). In a simple but not-limiting structure of the lens blank 1, the convex surface portion 2 may be spherical. Then the depression track 4 is a circle in the top face 11, which surrounds the convex surface portion 2.

Reference number 10 denotes a film structure, so-called film from now on. The film 10 may be of any kind and composition, and any initial shape. In particular, the film 10 may be a single layer or multilayer structure. It may be initially of planar shape. The film 10 is designed for providing additional functions to the eyeglass obtained from the lens blank 1 after this latter has been covered with the film 10 on its top face 11. For example, the film 10 may comprise an anti-reflection coating, and/or it may be suitable for producing a light-polarizing effect. A possible structure for the film 10 is a tri-layered structure, with an intermediate polarizing PVA (polyvinyl alcohol) layer adhered on each side to a protecting TAC (triacetate cellulose) outer layer. This film structure may be further provided with an anti-reflection coating on an outer surface of one of the TAC layers, which is intended to be facing away from the lens blank 1 in the final eyeglass to be produced.

The film 10 is resilient so that it can conform to the shape of the top face 11 of the lens blank 1. To this end, it may be necessary for the film 10 to be heated and/or preformed, but this is out of the scope of this invention.

Figure 3A:
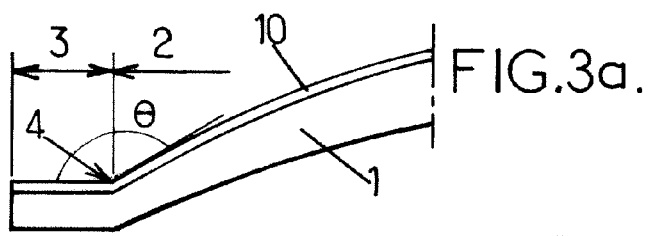
FIGS. 3a and 3b are enlarged sectional views showing the effect of the invention.

The invention enables applying the film 10 onto the top face 11, so that the film 10 is in contact with the top face 11 at or very close to the depression track 4. FIG. 3*a* shows such assembly of the film 10 and the lens blank 1, with the film 10 fully penetrating the re-entrant angle θ between the convex surface portion 2 and the margin portion 3 at the depression track 4. For comparison purpose, FIG. 3*b* reproduces an assembly of the film 10 with the lens blank 1 as obtained before the present invention. With the known application processes, the film 10 forms a bridge over the depression track 4, with a gap G therebetween. Because of this gap, the optically useful area of the lens blank 1 covered with the film 10 is reduced by two or three millimeters with respect to the whole convex surface portion 2. In addition, the gap G initiates wrinkles and film separation which may creep further just after the film application step and even later.

Figure 2C:
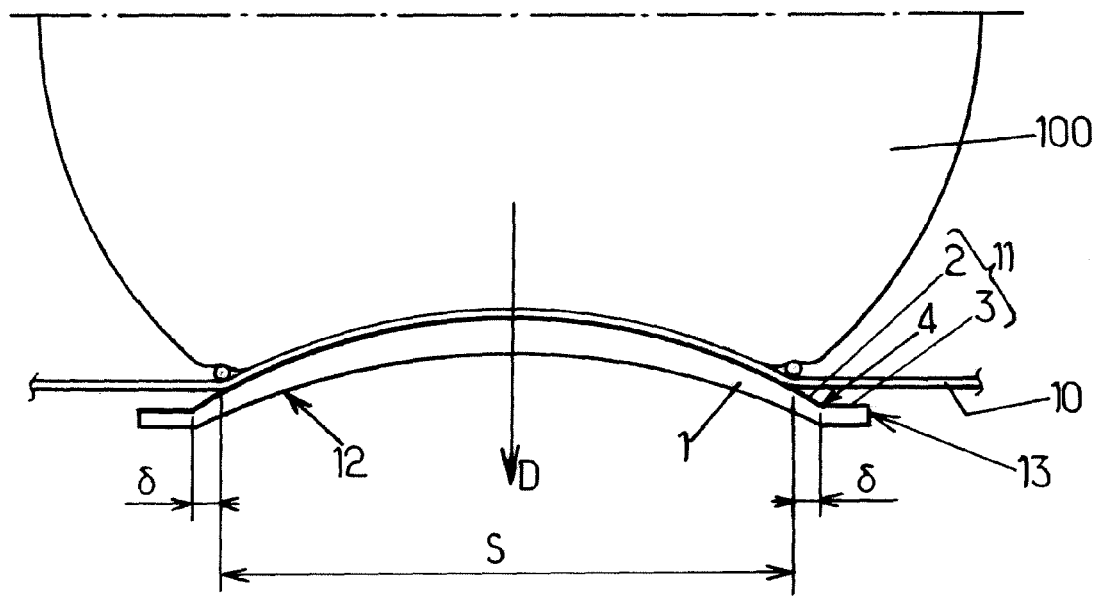
Figure 2D:
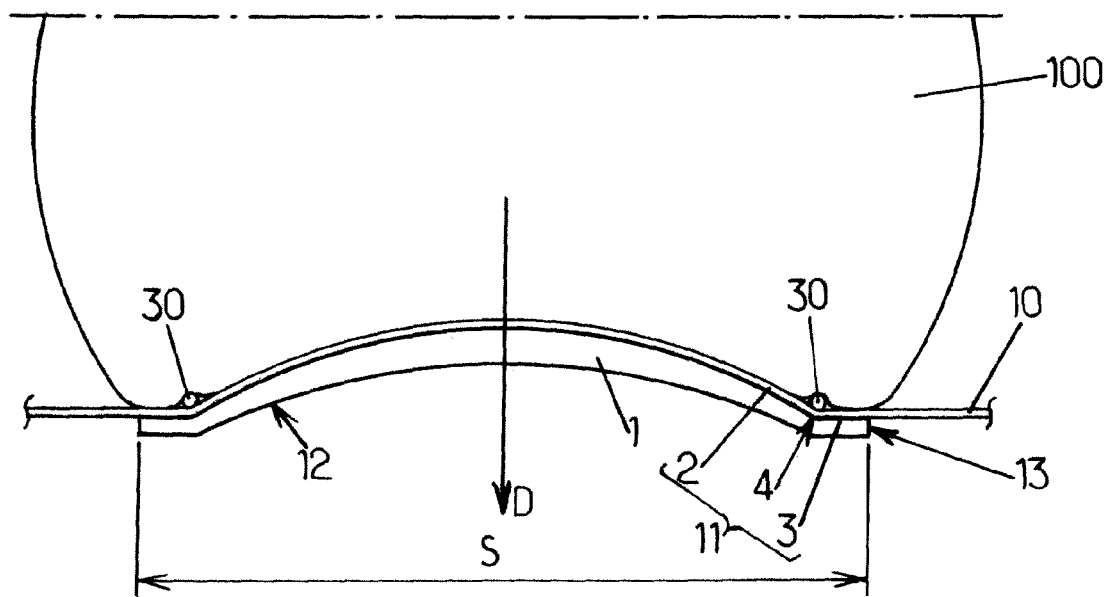

According to FIG. 2*a*, the film 10 may be applied onto the top face 11 of the lens blank 1 by pressing simultaneously at the same time the lens blank 1 and a resilient cushion 100 on both sides of the film 10. D denotes the moving direction of the lens blank 1 and the resilient cushion 100 towards one another. When forcing the resilient cushion 100 against the film 10, the cushion together with the film conform progressively to the shape of the convex surface portion 2 (FIGS. 2*b* to 2*d*). Actually, the film 10 and the top face 11 become in contact with each other within a contact area S which increases progressively as the cushion 100 is further crushed.

According to a possible implementation of the invention, the resilient cushion 100 may be an inflatable bladder which is supported fixedly with respect to the lens blank 1. Then, the suppression of the gap between the top face 11 of the lens blank 1 and the resilient cushion 100, as well as the deforming of the resilient cushion 100 against the film 10, can be produced easily by inflating the bladder.

Optionally, an adhesive material layer 20 may be arranged initially between the film 10 and the top face 11 of the lens blank 1. Then, the invention process results in fixing the film 10 onto the lens blank 1. The adhesive material of the layer 20 may be, in particular, a hot melt adhesive material. It may have been deposited initially on the top face 11 of the lens blank 1, for example by spin coating, so as to coat uniformly the top face 11. Alternatively, the adhesive material layer 20 may be born initially by the lower surface of the film 10.

During a first pressing period illustrated by FIG. 2*b*, the film 10 and the top face 11 are in contact with each other only within the convex surface portion 2. Put another way, the contact area S is contained in the convex surface portion 2. Thus, the film 10 accommodates a convex shape in the contact area S. The configuration of the contact area S at one moment during this first pressing period is considered as the initial contact area involved in the general part of this specification.

According to the invention, a wedge piece 30 is arranged initially between the resilient cushion 100 and the film 10. In a preferred arrangement, the film 10 may be generally oriented horizontally, with the lens blank 1 beneath the film 10 and the resilient cushion 100 above the film 10. Then, the wedge piece 30 may simply be lain down on the upper surface of the film 10. Moving direction D is then vertical.

Preferably, the wedge piece 30 is resilient, for preventing any damage caused by the process of the invention to the film 10 and also to the resilient cushion 100. For example, the wedge piece 30 may be rubber-based.

A thickness of the wedge piece 30 may be between 1 mm and 2.5 mm, measured along the moving direction D. Such thickness range for the wedge piece 30 is efficient for obtaining tight application of the film 10 in the re-entrant angle θ.

For a particular topography of the top face 11 of the lens blank 1 where the margin portion 3 surrounds the convex surface portion 2, then the wedge piece 30 may have a closed-loop shape. If the depression track 4 is a circle around the convex surface portion 2 as represented in FIGS. 1*a* and 1*b*, the wedge piece 30 may preferably be ring-shaped initially. For example, the wedge piece 30 may be an O-ring.

It is possible to arrange the wedge piece 30 so that it is located initially in line with the depression track 4 along the moving direction D. In such case, the first pressing period lasts until the contact area S reaches the depression track 4. Then, the process goes on directly as represented in FIG. 2*d*.

In a preferred arrangement, the wedge piece 30 is located initially on the film 10 so that its projection along the moving direction D onto the top face 11 of the lens blank 1 is within in the convex surface portion 2 apart from the depression track 4. FIGS. 2*a* to 2*c* correspond to such arrangement. Preferably, the wedge piece 30 is located initially between 1 mm and 10 mm from the depression track 4, inwards the convex surface portion 2, in a projection on the top face 11. More preferably, it is located initially between 1.5 mm and 3 mm from the depression track 4 in the projection on the top face 11. Reference sign $\delta_0$ in FIGS. 2a and 2b indicates such initial gap between the wedge piece 30 and the depression track 4. With such arrangement of the wedge piece 30, the increasing contact area S reaches the location of the wedge piece 30 before reaching the depression track 4. This corresponds to a second pressing period where the contact area S is moving from the projection of the initial location of the wedge piece 30 on the top face 11, to the depression track 4 (FIG. 2c). During this second pressing period, the increase of the contact area S causes the wedge piece 30 to slide towards the depression track 4, within the convex surface portion 2, due to the lateral expansion force which is produced by the resilient cushion 100 being further crushed. The gap between the wedge piece 30 and the depression track 4 is progressively reduced down to zero. It is labelled δ in FIG. 2c. At the end of the second pressing period, the wedge piece 30 has come in line with the depression track 4.

Finally, during a third pressing period, the resilient cushion 100 is still further crushed so that the contact area S goes on increasing through the margin portion 3, until it reaches the peripheral edge 13 of the lens blank 1. During this last pressing period, the wedge piece 30 is still pressed against the film 10 by the resilient cushion 100, but it remains retained in line with the depression track 4. FIG. 2d represents the situation at the end of this third pressing period. The final contact area S corresponds to the whole top face 11, thus astride the convex surface portion 2 and the margin portion 3.

Figure 3B:
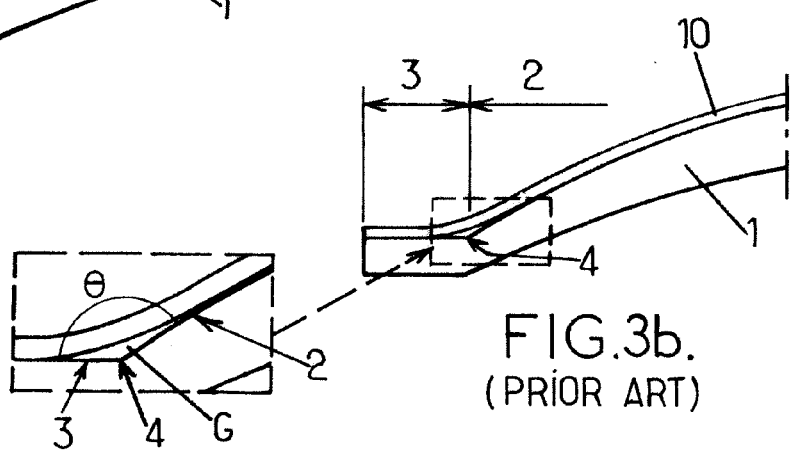

FIGS. 3a and 3b compare the resulting assemblies of the lens blank 1 with the film 10 when using the wedge piece 30 according to the invention (FIG. 3a) and without using the wedge piece (FIG. 3b). FIG. 3b shows the film 10 bridging above the depression track 4, with the gap G between the lens blank 1 and the film 10 which extends inwards the convex surface portion 2. The gap G reduces the optically useful area within the convex surface portion 2. As shown in FIG. 2a, using the wedge piece 30 suppresses the gap G between the lens blank 1 and the film 10 at the depression track 4, or at least makes this gap to reduce significantly.

The invention has been implemented with three types of eyeglass blanks which are now reported for illustration purpose only, without the numeral values indicated forming any general limitation for the invention claimed. Each eyeglass blank has a top face with a convex surface portion forming a progressive surface. This progressive surface is defined by a base value and an addition value in accordance with the common practice in ophthalmics. They correspond to 1.74 for the refractive index value of the transparent material of the eyeglass blanks. The margin portion is planar for all the eyeglass blanks considered. Then, the depression track has two different diameter values along two directions x and y perpendicular to each other. The film structure used for all the blanks is a layered stack comprised of a polyvinyl alcohol (PVA) light-polarizing layer sandwiched between two protecting triacetate cellulose (TAC) layers. The thickness of the PVA layer is 40 μm (micrometer) and that of each TAC layer is 80 μm. Table 1 hereafter indicates the values for these features of the eyeglass blanks together with the features of the wedge piece used in each case.

TABLE 1

| Eyeglass blank | Type 1 | Type 2 | Type 3 |
|---|---|---|---|
| Base value | 3.75 diopters | 6.50 diopters | 3.75 diopters |
| Addition value | 2.75 diopters | 3.00 diopters | 3.00 diopters |

TABLE 1-continued

| Eyeglass blank | Type 1 | Type 2 | Type 3 |
|---|---|---|---|
| x-diameter | 77 mm | 77 mm | 77 mm |
| y-diameter | 72 mm | 73 mm | 71.5 mm |
| Wedge piece | Die-cut from 1.5 mm thick rubber sheet with inner/outer diameters of 68 mm/72 mm | Die-cut from 1.5 mm thick rubber sheet with inner/outer diameters of 72 mm | Rubber O-ring with inner/outer diameters of 69.85 mm/74.60 mm |
| Δx (prior art) | 4.45 mm | 4.95 mm | 4.0 mm |
| Δx (invention) | 3.3 mm | 3.6 mm | 2.8 mm |
| Δy (prior art) | 3.7 mm | 4.0 mm | 3.75 mm |
| Δy (invention) | 2.15 mm | 1.65 mm | 2.95 mm |

In the four last lines of this Table 1, Δx and Δy denote the reductions in the x- and y-diameters of the optically useful area of the eyeglass within the convex surface portion, due to the bridge of the film structure above the depression track. They are measured with respect to the x- and y-diameter values of the depression track. The values for Δx and Δy when completed with "invention" correspond to the implementation of the wedge piece according to the invention. For sake of comparison, the Δx- and Δy-values which are indicated "prior art" correspond to same assembling parameters but without using the wedge piece. In all cases, the adhesive material layer 20 is 25 μm thick. Therefore, the invention clearly increases the optically useful area of the eyeglass blanks assembled with the film structure. Then, larger eyeglasses can be produced from the blanks provided with the film structure.

The invention claimed is:

1. A process to apply a film structure onto a lens blank, said lens blank being limited by a top face, a bottom face and a peripheral edge connecting said top face to said bottom face, said top face comprising a convex surface portion and a margin portion located between the convex surface portion and the peripheral edge, the convex surface portion and the margin portion forming a re-entrant angle along a depression track between said convex surface portion and said margin portion, the process comprising:

arranging the film structure between the top face of the lens blank and a resilient cushion;

pressing the film structure against the top face of the lens blank by moving the resilient cushion and the lens blank closer to each other, thereby deforming the resilient cushion and suppressing a gap existing initially between the film structure and the top face of the lens blank, with a contact area of said film structure with said top face which increases when the resilient cushion is being deformed, said contact area increasing progressively from an initial area comprised within the convex surface portion to a final area astride at least a part of said convex surface portion and at least a part of the margin portion adjacent said part of the convex surface portion, and arranging a closed-loop shaped wedge piece between the resilient cushion and the film structure, said wedge piece being pressed against the film structure by the resilient cushion being deformed, and said wedge piece being deformed to be situated in line with the depression track when the contact area has reached the final area, along a moving direction of the resilient cushion and the lens blank with respect to each other, wherein the wedge piece is arranged initially so that a projection of said wedge piece onto the top face of the lens blank, along the moving direction, is contained within the convex surface portion apart from the depression track, and the resilient cushion causes the wedge piece to slide towards said depression track as the resilient cushion is deformed.

2. The process according to claim 1, wherein the wedge piece is located initially so that the projection of the wedge piece along the moving direction onto the top face of the lens blank is between 1 mm and 10 mm from the depression track, inwards of the convex surface portion.

3. The process according to claim 2, wherein the wedge piece is located initially so that the projection of the wedge piece along the moving direction onto the top face of the lens blank is between 1.5 mm and 3 mm from the depression track.

4. The process according to claim 1, wherein the margin portion surrounds the convex surface portion within the top face of the lens blank.

5. The process according to claim 4, wherein the depression track is a circle around the convex surface portion, and the wedge piece is initially ring-shaped.

6. The process according to claim 5, wherein the wedge piece is an O-ring.

7. The process according to claim 1, wherein the wedge piece is resilient.

8. The process according to claim 7, wherein the wedge piece is rubber-based.

9. The process according to claim 1, wherein a thickness of the wedge piece is between 1 mm and 2.5 mm, measured along the moving direction.

10. The process according to claim 1, wherein the margin portion is planar.

11. The process according to claim 1, wherein further comprising:
arranging an adhesive material layer initially between the film structure and the top face of the lens blank, and fixing said film structure onto said lens blank using the adhesive material layer.

12. The process according to claim 1, wherein the lens blank is an ophthalmic lens blank designed for eyeglass production, with the convex surface portion forming an optically useful area of said eyeglass.

13. The process according to claim 1, wherein the film structure comprises an anti-reflection coating.

14. The process according to any claim 1, wherein the film structure is suitable for producing a light-polarizing effect.

15. The process according to claim 1, wherein the resilient cushion is an inflatable bladder supported fixedly with respect to the lens blank, and wherein a suppression of the gap between the top face of said lens blank and the resilient cushion is produced by inflating said bladder.

* * * * *